(12) United States Patent
Chen

(10) Patent No.: US 10,991,337 B2
(45) Date of Patent: Apr. 27, 2021

(54) METHOD FOR USING RGB BLEND TO PREVENT CHROMATIC DISPERSION OF VR DEVICE, AND ELECTRONIC DEVICE

(71) Applicant: HuiZhou TCL Mobile Communication Co., Ltd., HuiZhou (CN)

(72) Inventor: Yichong Chen, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 0 days.

(21) Appl. No.: 16/630,869

(22) PCT Filed: Jul. 13, 2018

(86) PCT No.: PCT/CN2018/095624
§ 371 (c)(1),
(2) Date: Jan. 14, 2020

(87) PCT Pub. No.: WO2019/011327
PCT Pub. Date: Jan. 17, 2019

(65) Prior Publication Data
US 2020/0152153 A1      May 14, 2020

(30) Foreign Application Priority Data
Jul. 14, 2017   (CN) .......................... 201710572828.8

(51) Int. Cl.
G09G 5/02    (2006.01)
G02B 27/00   (2006.01)
G06T 5/00    (2006.01)

(52) U.S. Cl.
CPC ......... *G09G 5/026* (2013.01); *G02B 27/0025* (2013.01); *G06T 5/006* (2013.01); *G09G 2320/0242* (2013.01)

(58) Field of Classification Search
None
See application file for complete search history.

(56) References Cited

U.S. PATENT DOCUMENTS

2003/0058250 A1* 3/2003 Adams, Jr. ........... G06K 15/021
                                                    345/589
2007/0086712 A1* 4/2007 Shani .................. G02B 6/0046
                                                    385/101
(Continued)

FOREIGN PATENT DOCUMENTS

CN   104020565   9/2014
CN   106791754   5/2017
(Continued)

OTHER PUBLICATIONS

International Search Report and the Written Opinion dated Sep. 12, 2018 From the International Searching Authority Re. Application No. PCT/CN2018/095624 and Its Translation of Search Report Into English. (10 Pages).

*Primary Examiner* — Michelle Chin

(57) ABSTRACT

A method for using RGB blend to prevent chromatic dispersion of a VR device includes: acquiring a refractive parameter at one point of a lens according to a curvature and a refractive index of the lens; acquiring all blend points corresponding to a point to be displayed according to an RGB parameter value corresponding to the point to be displayed in an image and the refractive parameter; and blending all of the blend points corresponding to the point to be displayed together, and displaying the point to be displayed.

18 Claims, 3 Drawing Sheets

(56) References Cited

U.S. PATENT DOCUMENTS

| | | |
|---|---|---|
| 2010/0009031 A1 | 4/2010 | Nguyen et al. |
| 2012/0106841 A1* | 5/2012 | Tzur ................... H04N 9/68 |
| | | 382/167 |
| 2014/0009368 A1 | 1/2014 | Hirota |
| 2015/0205126 A1* | 7/2015 | Schowengerdt ......... G02B 5/20 |
| | | 345/633 |
| 2018/0224695 A1* | 8/2018 | Zhang .................. B29D 11/00 |
| 2018/0338137 A1* | 11/2018 | Wang .................. H04N 13/243 |

FOREIGN PATENT DOCUMENTS

| | | |
|---|---|---|
| CN | 107219629 | 9/2017 |
| JP | 2015-162782 | 9/2015 |
| WO | WO 2019/011327 | 1/2019 |

\* cited by examiner

METHOD FOR USING RGB BLEND TO PREVENT CHROMATIC DISPERSION OF VR DEVICE, AND ELECTRONIC DEVICE

RELATED APPLICATIONS

This application is a National Phase of PCT Patent Application No. PCT/CN2018/095624 having International filing date of Jul. 13, 2018, which claims the benefit of priority of Chinese Patent Application No. 201710572828.8 filed on Jul. 14, 2017. The contents of the above applications are all incorporated by reference as if fully set forth herein in their entirety.

FIELD AND BACKGROUND OF THE INVENTION

The present disclosure relates to a mobile terminal technology field, and more particularly to a method for using RGB blend to prevent chromatic dispersion of a VR device and an electronic device.

A convex lens is used as a lens of a virtual reality (VR) device. It can be appreciated from a sectional view of the lens that the lens is similar to a prism having a thick thickness at a center and a thin thickness at an edge. Angles of the prism are larger along with the approach to the edge. Accordingly, chromatic dispersion phenomenon is more serious along with the approach to the edge.

Serious effect of the chromatic dispersion phenomenon leads to a change of display content and results in unclear identification. For example, one white point on a display screen becomes color light after the white point is seen through the lens. The color light is blended with adjacent pixel points, and chromatic dispersion of the adjacent pixel points is blended with the color light as well. Accordingly, the white point which should be displayed becomes a color point. Other pixel points have similar phenomenon. As such, the colors of a seen image are totally changed and more serious along with the approach to the edge.

SUMMARY OF THE INVENTION

The present disclosure provides a method for using RGB blend to prevent chromatic dispersion of a VR device and an electronic device capable of solving the problem that the colors of a seen image in a conventional smart terminal of the VR device are totally changed and more serious along with the approach to the edge.

The technical schemes are described as follows.

In a first aspect, an embodiment of the present disclosure provides a method for using RGB blend to prevent chromatic dispersion of a VR device, wherein the method includes steps of:

acquiring a refractive parameter at any one point of a lens according to a surface shape and a refractive index of the lens;

acquiring all blend points corresponding to a point to be displayed according to an RGB parameter value corresponding to the point to be displayed in an image and the refractive parameter; and blending all of the blend points corresponding to the point to be displayed together, and displaying the point to be displayed.

In the method for using the RGB blend to prevent the chromatic dispersion of the VR device, the refractive parameter at the any one point of the lens is acquired according to a curvature of the lens and the refractive index of the lens by calculation or optical simulation.

In the method for using the RGB blend to prevent the chromatic dispersion of the VR device, the step of acquiring all of the blend points corresponding to the point to be displayed according to the RGB parameter value corresponding to the point to be displayed in the image and the refractive parameter includes:

determining whether the point to be displayed corresponds to one of a red color, a green color, and a blue color according to the RGB parameter value corresponding to the point to be displayed in the image and the refractive parameter; if the point to be displayed corresponds to the one of the red color, the green color, and the blue color, performing the steps of blending all of the blend points corresponding to the point to be displayed together and displaying the point to be displayed;

if the point to be displayed does not correspond to the one of the red color, the green color, and the blue color, performing a step of:

acquiring respective proportions of red light, green light, and blue light corresponding to the point to be displayed.

In the method for using the RGB blend to prevent the chromatic dispersion of the VR device, the step of acquiring the respective proportions of the red light, the green light, and the blue light corresponding to the point to be displayed includes:

acquiring the RGB parameter value $r_o(R_0, G_0, B_0)$ of the point to be displayed in the image, wherein $R_0$ represents luminance of the red light corresponding to the point to be displayed, $G_0$ represents luminance of the green light corresponding to the point to be displayed, and $B_0$ represents luminance of the blue light corresponding to the point to be displayed;

acquiring all of the points which are blended with the point to be displayed according to the surface shape and the refractive index of the lens, and denoting the points which are blended with the point to be displayed as $r_1, r_2, \ldots, r_m$, $g_1, g_2, \ldots, g_n, r_m, b_1, b_2, \ldots, b_0$ respectively; and acquiring color coordinates $r_1(R_1, 0, 0)$, $r_2(R_2, 0, 0)$, $r_m(R_m, 0, 0)$, $g_1(0, G_1, 0)$, $g_2(0, G_2, 0), \ldots, g_n(0, G_n, 0), b_1(0, 0, B_1), b_2(0, 0, B_2), b_0(0, 0, B_0)$ corresponding to the blend points, wherein $R_i$ represents illuminance of red light corresponding to the color coordinate $r_i$, a range of i is [1, m], $G_j$ represents illuminance of green light corresponding to the color coordinate $g_j$, a range of j is [1, n], $B_k$ represents illuminance of blue light corresponding to the color coordinate $b_k$, and a range of k is [1, o].

In the method for using the RGB blend to prevent the chromatic dispersion of the VR device, the steps of blending all of the blend points corresponding to the point to be displayed together and displaying the point to be displayed include:

blending the color coordinates $r_1(R_1, 0, 0)$, $r_2(R_2, 0, 0)$, $r_m(R_m, 0, 0), g_1(0, G_1, 0), g_2(0, G_2, 0), \ldots, g_n(0, G_n, 0), b_1(0, 0, B_1), b_2(0, 0, B_2), \ldots, b_o(0, 0, B_o)$ corresponding to the blend points to acquire the RGB parameter value $r_o(R_0, G_0, B_0)$ of the point to be displayed, wherein $R_0 = R_1 + R_2 + \ldots + R_m$, $G_0 = G_1 + G_2 + \ldots + G_n$, and $B_0 = B_1 + B_2 + \ldots + B_o$; and displaying the RGB parameter value $r_o(R_0, G_0, B_0)$ corresponding to the point to be displayed.

In the method for using the RGB blend to prevent the chromatic dispersion of the VR device, a range of $R_0$ of the RGB parameter value $r_o(R_0, G_0, B_0)$ corresponding to the point to be displayed is [0, 255].

In the method for using the RGB blend to prevent the chromatic dispersion of the VR device, a range of $G_0$ of the RGB parameter value $r_o(R_0, G_0, B_0)$ corresponding to the point to be displayed is [0, 255].

In the method for using the RGB blend to prevent the chromatic dispersion of the VR device, a range of $B_0$ of the RGB parameter value $r_o(R_0, G_0, B_0)$ corresponding to the point to be displayed is [0, 255].

An electronic device includes:

a processor configured to implement instructions; and a storage device configured to store the instructions, wherein the instructions are loaded by the processor to perform the steps of the method for using the RGB blend to prevent the chromatic dispersion of the VR device.

An electronic device includes:

one or more processors; and a memory; and one or more programs, wherein the one or more programs are stored in the memory and configured to cause the one or more processors to perform steps of: acquiring a refractive parameter at any one point of a lens according to a refractive index of the lens and a curvature of a curved surface of the lens;

determining whether a point to be displayed corresponds to one of a red color, a green color, and a blue color according to an RGB parameter value corresponding to the point to be displayed in an image and the refractive parameter;

if yes, the point to be displayed is displayed; and if no, respective proportions of red light, green light, and blue light corresponding to the point to be displayed are acquired, all blend points corresponding to the point to be displayed are acquired according to the proportions of the red light, the green light, and the blue light and the refractive parameter at the any one point of the lens, all of the blend points corresponding to the point to be displayer are blended together, and the point to be displayed is displayed.

The refractive parameter at the any one point of the lens is acquired according to the curvature of the lens and the refractive index of the lens by calculation or optical simulation.

the one or more processors are further configured to perform steps of:

acquiring the RGB parameter value $r_o(R_0, G_0, B_0)$ of the point to be displayed in the image, wherein $R_0$ represents luminance of red light corresponding to the point to be displayed, $G_0$ represents luminance of green light corresponding to the point to be displayed, and $B_0$ represents luminance of blue light corresponding to the point to be displayed;

acquiring all of the blend points which are blended with the point to be displayed according to a surface shape and the refractive index of the lens, wherein the blend points are respectively denoted as $r_1, r_2, \ldots, r_m, g_1, g_2, \ldots, g_n, r_m, b_1, b_2, \ldots, b_o$; and acquiring color coordinates $r_1(R_1, 0, 0)$, $r_2(R_2, 0, 0)$, $r_m(R_m, 0, 0)$, $g_1(0, G_1, 0)$, $g_2(0, G_2, 0), \ldots, g_n(0, G_n, 0)$, $b_1(0, 0, B_1)$, $b_2(0, 0, B_2), \ldots, b_o(0, 0, B_o)$ corresponding to the blend points, wherein $R_i$ represents illuminance of red light corresponding to the color coordinate a range of i is [1, m], $G_j$ represents illuminance of green light corresponding to the color coordinate $g_j$, a range of j is [1, n], $B_k$ represents illuminance of blue light corresponding to the color coordinate $b_k$, and a range of k is [1, o].

the one or more processor are further configured to perform steps of:

blending the color coordinates $r_1(R_1, 0, 0)$, $r_2(R_2, 0, 0), \ldots, r_m(R_m, 0, 0)$, $g_1(0, G_1, 0)$, $g_2(0, G_2, 0), \ldots, g_n(0, G_n, 0)$, $b_1(0, 0, B_1)$, $b_2(0, 0, B_2), \ldots, b_o(0, 0, B_o)$ corresponding to the blend points to acquire the RGB parameter value $r_o(R_0, G_0, B_0)$ of the point to be displayed, wherein $R_0=R_1+R_2+ \ldots +R_m$, $G_0=G_1+G_2+ \ldots +G_n$, and $B_0=B_1+B_2+ \ldots +B_o$; and displaying the RGB parameter value $r_o(R_0, G_0, B_0)$ corresponding to the point to be displayed.

A range of $R_0$ of the RGB parameter value $r_o(R_0, G_0, B_0)$ corresponding to the point to be displayed is [0, 255].

A range of $G_0$ of the RGB parameter value $r_o(R_0, G_0, B_0)$ corresponding to the point to be displayed is [0, 255].

A range of $B_0$ of the RGB parameter value $r_o(R_0, G_0, B_0)$ corresponding to the point to be displayed is [0, 255].

In a display interface of the VR device of the present disclosure, the refractive parameters at different positions are acquired according to the refractive index and the curvature of the curved surface of the lens. The red color, the green color, and the blue color in the image can be displayed directly. Blended colors among the red color, the green color, and the blue color are optimized according to refractive situations, and then the refractive parameters at the different positions are acquired. The blended colors are acquired according to the refractive parameters, and the respective proportions of the red color, the green color, and the blue color are identified to synthesize the needed colors, thereby avoiding that the chromatic dispersion phenomenon occurs when the blended colors are directly displayed.

DESCRIPTION OF SPECIFIC EMBODIMENTS OF THE INVENTION

The present disclosure provides a method for using RGB blend to prevent chromatic dispersion of a VR device and an electronic device. To make the objectives, technical schemes, and technical effect of the present disclosure more clearly and definitely, the present disclosure will be described in details below by using embodiments in conjunction with the appending drawings. It should be understood that the specific embodiments described herein are merely for explaining the present disclosure but not intended to limit the present disclosure.

Figure 1:
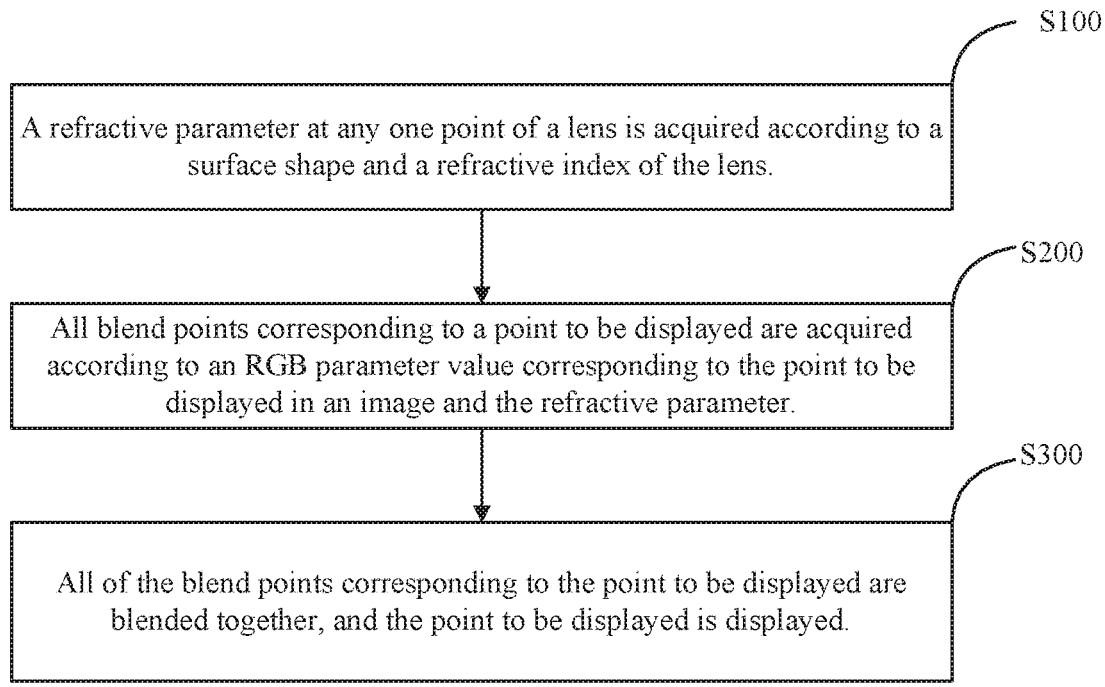
FIG. 1 illustrates a flow chart of a method for using RGB blend to prevent chromatic dispersion of a VR device in accordance with a preferred embodiment of the present disclosure.

Please refer to FIG. 1. FIG. 1 illustrates a flow chart of a method for using RGB blend to prevent chromatic dispersion of a VR device in accordance with a preferred embodiment of the present disclosure. As shown in FIG. 1, the method includes the following steps.

In step S100, a refractive parameter at any one point of a lens is acquired according to a surface shape and a refractive index of the lens.

In step S200, all blend points corresponding to a point to be displayed are acquired according to an RGB parameter value corresponding to the point to be displayed in an image and the refractive parameter.

In step S300, all of the blend points corresponding to the point to be displayed are blended together, and the point to be displayed is displayed.

A display screen of a mobile phone (or any other device) for a VR device usually uses the three-primary colors including a red color, a green color, and a blue color (RGB) to display an image. Accordingly, chromatic dispersion phenomenon can be improved significantly when an interface for displaying the image (on the display screen of the mobile phone or the display screen of any other device) is designed according to the three-primary colors. The three colors are pure colors, and thus the chromatic dispersion phenomenon does not occur. Certainly, the red color, the green color, and the blue color of the display screen of the mobile phone are not shown by single-wavelength light. As such, strictly speaking, the chromatic dispersion phenomenon still exists. Usually, each point on the display screen can be represented by a color coordinate, for example, (R, G, B). R, G, and B respectively represent the red color, the green color, and the blue color. Each of the three colors includes 8 bits for representing changes of 256 gray levels. (R, 0, 0), (0, G, 0), and (0, 0, B) respectively represent different gray levels of the red color, the green color, and the blue color.

When only the three pure colors are used to display the interface, the display effect of the image is decreased and the color is not rich although the chromatic dispersion phenomenon can be avoided. Accordingly, it is necessary to compensate the image using any other method. Needed colors can be synthesized by blending the three pure colors. This is because curve degrees of light having different wavelengths are different due to the effect of the lens. As such, a new color seen by human eyes can be synthesized by light positioned at two different points on the screen of the mobile phone and having different wavelengths.

Figure 5:
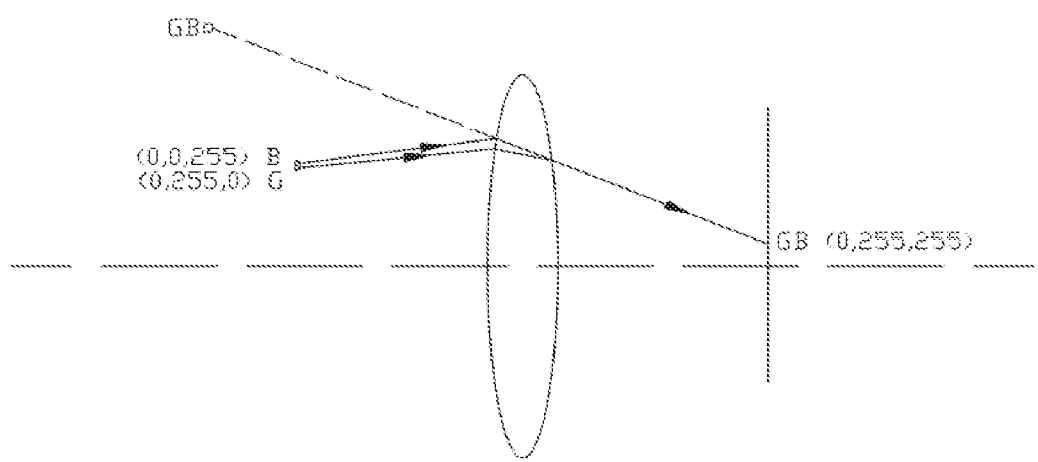
FIG. 5 illustrates that green light and blue light at two adjacent points are generated by a display screen of a mobile phone.

For example, as shown in FIG. 5, the green light G (0, 255, 0) and the blue light B (0, 0, 255) at two adjacent points are generated by the display screen of the mobile phone. Since a wavelength of the blue light B is shorter, a curve degree of the blue light B is greater than a curve degree of the green light G due to the effect of the lens. After the green light G and the blue light B pass through the lens, the green light G and the blue light B are blended together. After the green light G and the blue light B are blended together, light which is seen by human eyes is GB (0, 255, 255) instead of the green light G and the blue light B.

Accordingly, in the design of the interface, using the three pure colors can avoid the chromatic dispersion phenomenon. Design of needed colors among the three colors is necessary to be optimized. First, it is necessary to acquire the refractive index of the lens. Different lenses have different refractive indices. Curve degrees of light at different positions of the same lens are also different because of the surface shape of the lens. The curve degrees can be acquired by calculation or optical simulation. For the same lens, a curve degree of light at an edge is greater than a curve degree of light at a center. Accordingly, design of the different positions is necessary to be optimized. Optical information corresponding to the positions should be acquired. Then, design of colors is optimized, thereby avoiding that unnecessary colors appear when different colors are blended together.

In the embodiment of the present disclosure, refractive parameters at different positions are acquired according to the refractive index and a curvature of a curved surface of the lens. The red color, the green color, and the blue color in the image can be displayed directly. Blended colors among the red color, the green color, and the blue color are optimized according to refractive situations, and then the refractive parameters at the different positions are acquired. The blended colors are acquired according to the refractive parameters, and respective proportions of the red color, the green color, and the blue color are identified to synthesize the needed colors, thereby avoiding that the chromatic dispersion phenomenon occurs when the blended colors are directly displayed.

In one embodiment, in the method for using the RGB blend to prevent the chromatic dispersion of the VR device, the refractive parameter at any one point of the lens is acquired by calculation or optical simulation according to the curvature and the refractive index of the lens. In a practical application, the curvatures of limited points on the lens can be acquired by optical simulation. Curvatures of other points can be acquired by an interpolation method. As such, the refractive parameter of light at each point can be acquired to identify blended weights corresponding to light of the three colors.

Figure 2:
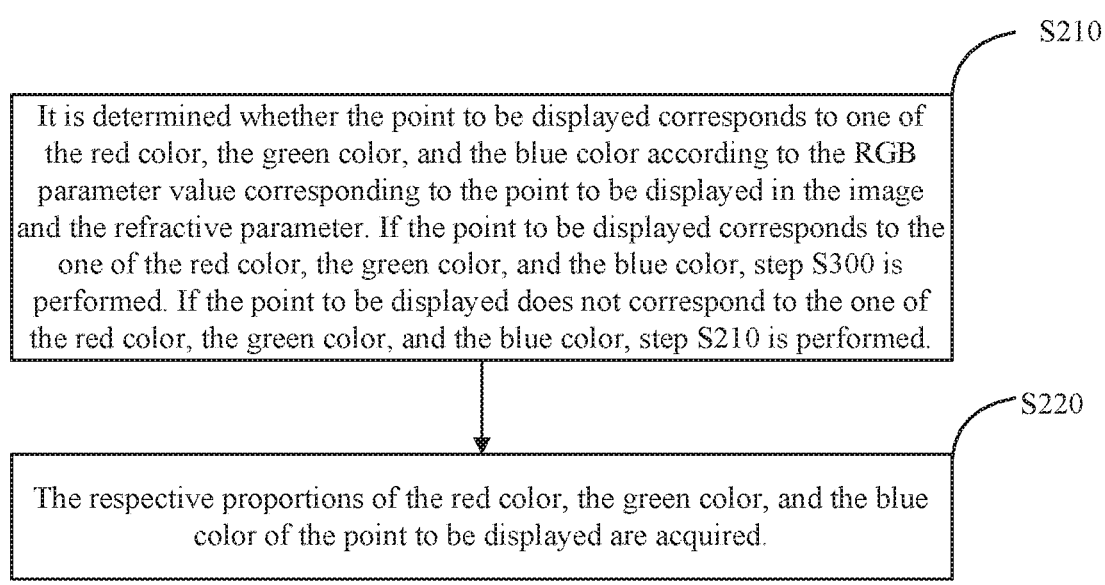
FIG. 2 illustrates a detailed flow chart of step S200 in the method for using the RGB blend to prevent the chromatic dispersion of the VR device in accordance with a preferred embodiment of the present disclosure.

As shown in FIG. 2, in the method for using the RGB blend to prevent the chromatic dispersion of the VR device, step S200 specifically includes the following steps.

In step S210, it is determined whether the point to be displayed corresponds to one of the red color, the green color, and the blue color according to the RGB parameter value corresponding to the point to be displayed in the image and the refractive parameter. If the point to be displayed corresponds to the one of the red color, the green color, and the blue color, step S300 is performed. If the point to be displayed does not correspond to the one of the red color, the green color, and the blue color, step S220 is performed.

In step S220, the respective proportions of the red color, the green color, and the blue color of the point to be displayed are acquired.

In the embodiment of the present disclosure, the blended colors among the red color, the green color, and the blue color are necessary to be optimized according to the refractive situations of the lens. That is, the refractive parameter at the position of the point to be displayed is acquired. The blended color is acquired according to the refractive parameter, and the respective proportions of the red color, the green color, and the blue color are identified to synthesize the needed color. Unnecessary colors can be avoided when different colors are blended together.

Figure 3:
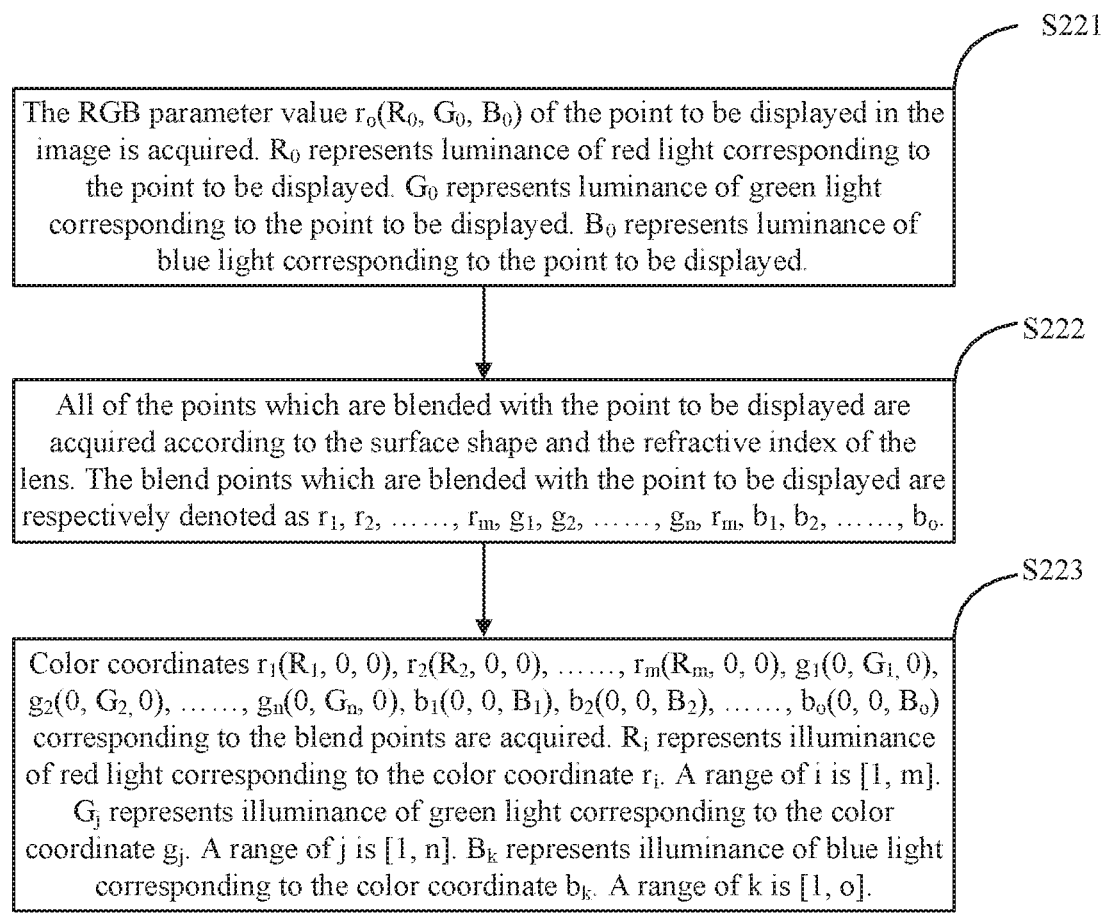
FIG. 3 illustrates a detailed flow chart of step S220 in the method for using the RGB blend to prevent the chromatic dispersion of the VR device in accordance with a preferred embodiment of the present disclosure.

In detail, as shown in FIG. 3, in the method for using the RGB blend to prevent the chromatic dispersion of the VR device, step S220 specifically includes the following steps.

In step S221, the RGB parameter value $r_o(R_0, G_0, B_0)$ of the point to be displayed in the image is acquired. $R_0$ represents luminance of red light corresponding to the point to be displayed. $G_0$ represents luminance of green light corresponding to the point to be displayed. $B_0$ represents luminance of blue light corresponding to the point to be displayed.

In step S222, all of the points which are blended with the point to be displayed are acquired according to the surface shape and the refractive index of the lens. The blend points which are blended with the point to be displayed are respectively denoted as $r_1, r_2, \ldots, r_m, g_1, g_2, \ldots, g_n, r_m, b_2, \ldots, b_o$.

In step S223, color coordinates $r_1(R_1, 0, 0), r_2(R_2, 0, 0), \ldots, r_m(R_m, 0, 0), g_1(0, G_1, 0), g_2(0, G_2, 0), \ldots, g_n(0, G_n, 0), b_1(0, 0, B_1), b_2(0, 0, B_2), \ldots, b_o(0, 0, B_o)$ corresponding to the blend points are acquired. $R_i$ represents illuminance of red light corresponding to the color coordinate $r_i$. A range of i is [1, m]. $G_j$ represents illuminance of green light corresponding to the color coordinate $g_j$. A range of j is [1, n]. $B_k$ represents illuminance of blue light corresponding to the color coordinate $b_k$. A range of k is [1, o].

Amongst, m, n, and o are positive integers, and i, j, and k are also positive integers.

Figure 4:
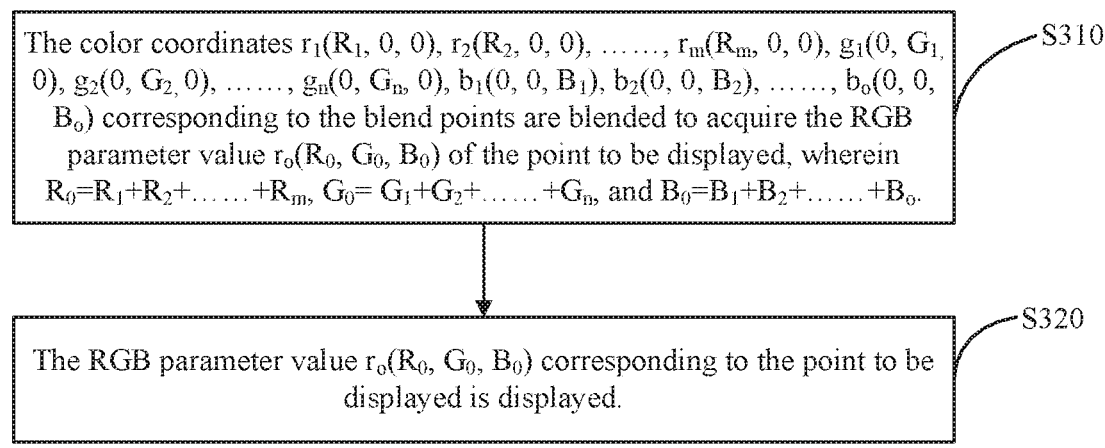
FIG. 4 illustrates a detailed flow chart of step S300 in the method for using the RGB blend to prevent the chromatic dispersion of the VR device in accordance with a preferred embodiment of the present disclosure.

In an implementation, as shown in FIG. 4, in the method for using the RGB blend to prevent the chromatic dispersion of the VR device, step S300 specifically includes the following steps.

In step S310, the color coordinates $r_1(R_1, 0, 0), r_2(R_2, 0, 0), \ldots, r_m(R_m, 0, 0), g_1(0, G_1, 0), g_2(0, G_2, 0), \ldots, g_n(0, G_n, 0), b_1(0, 0, B_1), b_2(0, 0, B_2), \ldots, b_o(0, 0, B_o)$ corresponding to the blend points are blended to acquire the RGB parameter value $r_o(R_0, G_0, B_0)$ of the point to be displayed, wherein $R_0=R_1+R_2+\ldots+R_m$, $G_0=G_1+G_2+\ldots+G_n$, and $B_0=B_1+B_2+\ldots+B_o$.

In step S320, the RGB parameter value $r_o(R_0, G_0, B_0)$ corresponding to the point to be displayed is displayed.

A range of $R_0$ of the RGB parameter value $r_o(R_0, G_0, B_0)$ corresponding to the point to be displayed is [0, 255]. A range of $G_0$ is [0, 255]. A range of $B_0$ is [0, 255].

Since the lens is symmetrical with respect to the center of the lens, refractive results at points having the same radius are the same. For a point $r_o$ on the lens, one point which can be blended with the point $r_o$ must be near the point $r_o$ and in a radial direction the same as a radial direction of the point $r_o$. Assuming that a color require to be displayed at the point $r_o$ at is $(R_0, G_0, B_0)$ and the color coordinates corresponding to the blend points which are blended with the point $r_o$ are $r_1(R_1, 0, 0), r_2(R_2, 0, 0), \ldots, r_m(R_m, 0, 0), g_1(0, G_1, 0), g_2(0, G_2, 0), \ldots, g_n(0, G_n, 0), b_1(0, 0, B_1), b_2(0, 0, B_2), \ldots, b_o(0, 0, B_o)$. As long as the following three equations are valid, the RGB parameter $r_o(R_0, G_0, B_0)$ can be acquired by blending $r_1(R_1, 0, 0), r_2(R_2, 0, 0), \ldots, r_m(R_m, 0, 0), g_1(0, G_1, 0), g_2(0, G_2, 0), \ldots, g_n(0, G_n, 0), b_1(0, 0, B_1), b_2(0, 0, B_2), \ldots, b_o(0, 0, B_o)$.

$$R_0=R_1+R_2+\ldots+R_m$$

$$G_0=G_1+G_2+\ldots+G_n$$

$$B_0=B_1+B_2+\ldots+B_o$$

The display effect of the RGB parameter $r_o(R_0, G_0, B_0)$ can be acquired by blending $R_1, R_2, \ldots, R_m, G_1, G_2, \ldots, G_N, B_1, B_2, \ldots, B_o$. Accordingly, the method for using the RGB blend to prevent the chromatic dispersion of the VR device of the present disclosure can avoid the chromatic dispersion phenomenon when the blended colors are directly displayed.

The present disclosure further provides a storage medium storing a plurality of instructions. The instructions can be loaded by a processor to perform the steps of the method for using the RGB blend to prevent the chromatic dispersion of the VR device.

The present disclosure further provides an electronic device including:

a processor configured to implement instructions; and a storage device configured to store the instructions, wherein the instructions are loaded by the processor to perform the steps of the method for using the RGB blend to prevent the chromatic dispersion of the VR device.

The present disclosure further provides an electronic device including:

one or more processors;

a memory; and one or more programs, wherein the one or more programs are stored in the memory and configured to cause the one or more processors to perform steps of: acquiring a refractive parameter at any one point of a lens according to a refractive index of the lens and a curvature of a curved surface of the lens;

determining whether a point to be displayed corresponds to one of a red color, a green color, and a blue color according to an RGB parameter value corresponding to the point to be displayed in the image and the refractive parameter;

if yes, the point to be displayed is displayed; and if no, respective proportions of red light, green light, and blue light corresponding to the point to be displayed are acquired, all blend points corresponding to the point to be displayed are acquired according to the respective proportions of the red light, the green light, and the blue light and the refractive parameter at the any one point of the lens, all of the blend points corresponding to the point to be displayer are blended together, and the point to be displayed is displayed.

The refractive parameter at the any one point of the lens is acquired according to the curvature of the lens and the refractive index of the lens by calculation or optical simulation.

The one or more processors are further configured to perform steps of:

acquiring the RGB parameter value $r_o(R_0, G_0, B_0)$ of the point to be displayed in the image, wherein $R_0$ represents luminance of red light corresponding to the point to be displayed, $G_0$ represents luminance of green light corresponding to the point to be displayed, and $B_0$ represents luminance of blue light corresponding to the point to be displayed;

acquiring all of the blend points which are blended with the point to be displayed according to the surface shape and the refractive index of the lens, wherein the blend points are respectively denoted as $r_1, r_2, \ldots, r_m, g_1, g_2, \ldots, g_n, r_m, b_1, b_2, \ldots, b_o$; and acquiring color coordinates $r_1(R_1, 0, 0), r_2(R_2, 0, 0) \ldots, r_m(R_m, 0, 0), g_1(0, G_1, 0), g_2(0, G_2, 0), \ldots, g_n(0, G_n, 0), b_1(0, 0, B_1), b_2(0, 0, B_2), \ldots, b_o(0, 0, B_o)$ corresponding to the blend points, wherein $R_i$ represents illuminance of red light corresponding to the color coordinate $r_i$, a range of i is [1, m], $G_j$ represents illuminance of green light corresponding to the color coordinate $g_j$, a range of j is [1, n], $B_k$ represents illuminance of blue light corresponding to the color coordinate $b_k$, and a range of k is [1, o].

The one or more processors are further configured to perform steps of:

blending the color coordinates $r_1(R_1, 0, 0), r_2(R_2, 0, 0), \ldots, r_m(R_m, 0, 0), g_1(0, G_1, 0), g_2(0, G_2, 0), \ldots, g_n(0, G_n, 0), b_1(0, 0, B_1), b_2(0, 0, B_2), \ldots, b_o(0, 0, B_o)$ corresponding to the blend points to acquire the RGB parameter value $r_o(R_0, G_0, B_0)$ of the point to be displayed, wherein $R_0=R_1+R_2+ \ldots +R_m$, $G_0=G_1+G_2+ \ldots +G_n$, and $B_0=B_1+B_2+ \ldots +B_o$; and displaying the RGB parameter value $r_o(R_0, G_0, B_0)$ corresponding to the point to be displayed.

A range of $R_0$ of the RGB parameter value $r_o(R_0, G_0, B_0)$ corresponding to the point to be displayed is [0, 255].

A range of $G_0$ of the RGB parameter value $r_o(R_0, G_0, B_0)$ corresponding to the point to be displayed is [0, 255].

A range of $B_0$ of the RGB parameter value $r_o(R_0, G_0, B_0)$ corresponding to the point to be displayed is [0, 255].

In summary, in a display interface of the VR device of the present disclosure, the refractive parameters at different positions are acquired according to the refractive index and the curvature of the curved surface of the lens. The red color, the green color, and the blue color in the image can be displayed directly. Blended colors among the red color, the green color, and the blue color are optimized according to refractive situations, and then the refractive parameters at the different positions are acquired. The blended colors are acquired according to the refractive parameters, and the respective proportions of the red color, the green color, and the blue color are identified to synthesize the needed colors, thereby avoiding that the chromatic dispersion phenomenon occurs when the blended colors are directly displayed.

It should be understood that present disclosure is not limited to the exemplary examples. Those skilled in the art in the art may achieve equivalent improvements or replacements according to the above description. The equivalent improvements and replacements should be considered to belong to the protection scope of the present disclosure.

What is claimed is:

1. A method for using RGB blend to prevent chromatic dispersion of a VR device, wherein the method comprises steps of:

acquiring a refractive parameter at any one point of a lens according to a curvature and a refractive index of the lens;

acquiring all blend points corresponding to a point to be displayed according to an RGB parameter value corresponding to the point to be displayed in an image and the refractive parameter; and blending all of the blend points corresponding to the point to be displayed together, and displaying the point to be displayed, wherein the step of acquiring all of the blend points corresponding to the point to be displayed according to the RGB parameter value corresponding to the point to be displayed in the image and the refractive parameter comprises:

determining whether the point to be displayed corresponds to one of a red color, a green color, and a blue color according to the RGB parameter value corresponding to the point to be displayed in the image and the refractive parameter;

if the point to be displayed corresponds to the one of the red color, the green color, and the blue color, performing the steps of blending all of the blend points corresponding to the point to be displayed together and displaying the point to be displayed;

if the point to be displayed does not correspond to the one of the red color, the green color, and the blue color, performing a step of:

acquiring respective proportions of red light, green light, and blue light corresponding to the point to be displayed.

2. The method for using the RGB blend to prevent the chromatic dispersion of the VR device of claim 1, wherein the refractive parameter at the any one point of the lens is acquired according to the curvature of the lens and the refractive index of the lens by calculation or optical simulation.

3. The method for using the RGB blend to prevent the chromatic dispersion of the VR device of claim 1, wherein the step of acquiring the respective proportions of the red light, the green light, and the blue light corresponding to the point to be displayed comprises:

acquiring the RGB parameter value $r_o(R_0, G_0, B_0)$ of the point to be displayed in the image, wherein $R_0$ represents luminance of the red light corresponding to the point to be displayed, $G_0$ represents luminance of the green light corresponding to the point to be displayed, and $B_0$ represents luminance of the blue light corresponding to the point to be displayed;

acquiring all of the blend points which are blended with the point to be displayed according to the curvature and the refractive index of the lens, and denoting the blend points which are blended with the point to be displayed as $r_1, r_2, \ldots, r_m, g_1, g_2, \ldots, g_n, r_m, b_1, b_2, \ldots, b_o$ respectively; and acquiring color coordinates $r_1(R_1, 0, 0)$, $r_2(R_2, 0, 0), \ldots, r_m(R_m, 0, 0), g_1(0, G_1, 0), g_2(0, G_2, 0), \ldots, g_n(0, G_n, 0), b_1(0, 0, B_1), b_2(0, 0, B_2), \ldots, b_o(0, 0, B_o)$ corresponding to the blend points, wherein $R_i$ represents illuminance of red light corresponding to the color coordinate $r_i$, a range of i is [1, m], $G_j$ represents illuminance of green light corresponding to the color coordinate $g_j$, a range of j is [1, n], $B_k$ represents illuminance of blue light corresponding to the color coordinate $b_k$, and a range of k is [1, o].

4. The method for using the RGB blend to prevent the chromatic dispersion of the VR device of claim 3, wherein the steps of blending all of the blend points corresponding to the point to be displayed together and displaying the point to be displayed comprise:

blending the color coordinates $r_1(R_1, 0, 0)$, $r_2(R_2, 0, 0), \ldots, r_m(R_m, 0, 0), g_1(0, G_1, 0), g_2(0, G_2, 0), \ldots, g_n(0, G_n, 0), b_1(0, 0, B_1), b_2(0, 0, B_2), \ldots, b_o(0, 0, B_o)$ corresponding to the blend points to acquire the RGB parameter value $r_o(R_0, G_0, B_0)$ of the point to be displayed, wherein $R_0=R_1+R_2+ \ldots +R_m$, $G_0=G_1+G_2+ \ldots +G_n$, and $B_0=B_1+B_2+ \ldots +B_o$; and displaying the RGB parameter value $r_o(R_0, G_0, B_0)$ corresponding to the point to be displayed.

5. The method for using the RGB blend to prevent the chromatic dispersion of the VR device of claim 3, wherein a range of $R_0$ of the RGB parameter value $r_o(R_0, G_0, B_0)$ corresponding to the point to be displayed is [0, 255].

6. The method for using the RGB blend to prevent the chromatic dispersion of the VR device of claim 3, wherein a range of $G_0$ of the RGB parameter value $r_o(R_0, G_0, B_0)$ corresponding to the point to be displayed is [0, 255].

7. The method for using the RGB blend to prevent the chromatic dispersion of the VR device of claim 3, wherein a range of $B_0$ of the RGB parameter value $r_o(R_0, G_0, B_0)$ corresponding to the point to be displayed is [0, 255].

8. An electronic device, comprising:

a processor configured to implement instructions; and a storage device configured to store the instructions, wherein the instructions are loaded by the processor to perform steps of:

acquiring a refractive parameter at any one point of a lens according to a curvature and a refractive index of the lens;

acquiring all blend points corresponding to a point to be displayed according to an RGB parameter value corresponding to the point to be displayed in an image and the refractive parameter; and blending all of the blend points corresponding to the point to be displayed together, and displaying the point to be displayed, wherein the step of acquiring all of the blend points corresponding to the point to be displayed according to the RGB parameter value corresponding to the point to be displayed in the image and the refractive parameter comprises:

determining whether the point to be displayed corresponds to one of a red color, a green color, and a blue color according to the RGB parameter value corresponding to the point to be displayed in the image and the refractive parameter;

if the point to be displayed corresponds to the one of the red color, the green color, and the blue color, performing the steps of blending all of the blend points corresponding to the point to be displayed together and displaying the point to be displayed;

if the point to be displayed does not correspond to the one of the red color, the green color, and the blue color, performed a step of:

acquiring respective proportions of red light, green light, and blue light corresponding to the point to be displayed.

9. The electronic device of claim 8, wherein the refractive parameter at the any one point of the lens is acquired according to the curvature of the lens and the refractive index of the lens by calculation or optical simulation.

10. The electronic device of claim 8, wherein the step of acquiring the respective proportions of the red light, the green light, and the blue light corresponding to the point to be displayed comprises:

acquiring the RGB parameter value $r_o(R_0, G_0, B_0)$ of the point to be displayed in the image, wherein $R_0$ represents luminance of the red light corresponding to the point to be displayed, $G_0$ represents luminance of the green light corresponding to the point to be displayed, and $B_0$ represents luminance of the blue light corresponding to the point to be displayed;

acquiring all of the blend points which are blended with the point to be displayed according to the curvature and the refractive index of the lens, and denoting the blend points which are blended with the point to be displayed as $r_1, r_2, \ldots, r_m, g_1, g_2, \ldots, g_n, r_m, b_1, b_2, \ldots, b_o$ respectively; and acquiring color coordinates $r_1(R_1, 0, 0)$, $r_2(R_2, 0, 0), \ldots, r_m(R_m, 0, 0), g_1(0, G_1, 0), g_2(0, G_2, 0), \ldots, g_n(0, G_n, 0), b_1(0, 0, B_1), b_2(0, 0, B_2), \ldots, b_o(0, 0, B_o)$ corresponding to the blend points, wherein $R_i$ represents illuminance of red light corresponding to the color coordinate $r_i$, a range of i is [1, m], $G_j$ represents illuminance of green light corresponding to the color coordinate $g_j$, a range of j is [1, n], $B_k$ represents illuminance of blue light corresponding to the color coordinate $b_k$, and a range of k is [1, o].

11. The electronic device of claim 10, wherein the steps of blending all of the blend points corresponding to the point to be displayed together and displaying the point to be displayed comprise:

blending the color coordinates $r_1(R_1, 0, 0)$, $r_2(R_2, 0, 0), \ldots, r_m(R_m, 0, 0), g_1(0, G_1, 0), g_2(0, G_2, 0), \ldots, g_n(0, G_n, 0), b_1(0, 0, B_1), b_2(0, 0, B_2), \ldots, b_o(0, 0, B_o)$ corresponding to the blend points to acquire the RGB parameter value $r_o(R_0, G_0, B_0)$ of the point to be displayed, wherein $R_0 = R_1 + R_2 + \ldots + R_m$, $G_0 = G_1 + G_2 + \ldots + G_n$, and $B_0 = B_1 + B_2 + \ldots + B_o$; and displaying the RGB parameter value $r_o(R_0, G_0, B_0)$ corresponding to the point to be displayed.

12. An electronic device, comprising:

at least one processor; and a memory; and at least one program, wherein the at least one program is stored in the memory and configured to cause the at least one processor to perform steps of:

acquiring a refractive parameter at any one point of a lens according to a refractive index of the lens and a curvature of the lens;

determining whether a point to be displayed corresponds to one of a red color, a green color, and a blue color according to an RGB parameter value corresponding to the point to be displayed in an image and the refractive parameter;

if yes, the point to be displayed is displayed; and if no, respective proportions of red light, green light, and blue light corresponding to the point to be displayed are acquired, all blend points corresponding to the point to be displayed are acquired according to the proportions of the red light, the green light, and the blue light and the refractive parameter at the any one point of the lens, all of the blend points corresponding to the point to be displayer are blended together, and the point to be displayed is displayed.

13. The electronic device of claim 12, wherein the refractive parameter at the any one point of the lens is acquired according to the curvature of the lens and the refractive index of the lens by calculation or optical simulation.

14. The electronic device of claim 12, wherein the at least one processor is further configured to perform steps of:

acquiring the RGB parameter value $r_o(R_0, G_0, B_0)$ of the point to be displayed in the image, wherein $R_0$ represents luminance of red light corresponding to the point to be displayed, $G_0$ represents luminance of green light corresponding to the point to be displayed, and $B_0$ represents luminance of blue light corresponding to the point to be displayed;

acquiring all of the blend points which are blended with the point to be displayed according to the curvature and the refractive index of the lens, wherein the blend points are respectively denoted as $r_1, r_2, \ldots, r_m, g_1, g_2, \ldots, g_n, r_m, b_1, b_2, \ldots, b_o$; and acquiring color coordinates $r_1(R_1, 0, 0)$, $r_2(R_2, 0, 0), r_m(R_m, 0, 0), g_1(0, G_1, 0), g_2(0, G_2, 0), \ldots, g_n(0, G_m, 0), b_1(0, 0, B_1), b_2(0, 0, B_2), \ldots, b_o(0, 0, B_o)$ corresponding to the blend points, wherein $R_i$ represents illuminance of red light corresponding to the color coordinate $r_i$, a range of i is [1, m], $G_j$ represents illuminance of green light corresponding to the color coordinate $g_j$, a range of j is [1, n], $B_k$ represents illuminance of blue light corresponding to the color coordinate $b_k$, and a range of k is [1, o].

15. The electronic device of claim 14, wherein the at least one processor is further configured to perform steps of:

blending the color coordinates $r_1(R_1, 0, 0)$, $r_2(R_2, 0, 0), \ldots, r_m(R_m, 0, 0), g_1(0, G_1, 0), g_2(0, G_2, 0), \ldots, g_n(0, G_n, 0), b_1(0, 0, B_1), b_2(0, 0, B_2), \ldots, b_o(0, 0, B_o)$ corresponding to the blend points to acquire the RGB parameter value $r_o(R_0, G_0, B_0)$ of the point to be displayed, wherein $R_0 = R_1 + R_2 + \ldots + R_m$, $G_0 = G_1 + G_2 + \ldots + G_n$, and $B_0 = B_1 + B_2 + \ldots + B_o$; and displaying the RGB parameter value $r_o(R_0, G_0, B_0)$ corresponding to the point to be displayed.

16. The electronic device of claim 14, wherein a range of $R_0$ of the RGB parameter value $r_o(R_0, G_0, B_0)$ corresponding to the point to be displayed is [0, 255].

17. The electronic device of claim 14, wherein a range of $G_0$ of the RGB parameter value $r_o(R_0, G_0, B_0)$ corresponding to the point to be displayed is [0, 255].

18. The electronic device of claim 14, wherein a range of $B_0$ of the RGB parameter value $r_o(R_0, G_0, B_0)$ corresponding to the point to be displayed is [0, 255].

* * * * *